United States Patent [19]
Suga et al.

[11] Patent Number: 5,203,291
[45] Date of Patent: Apr. 20, 1993

[54] VALVE TIMING CONTROL SYSTEM FOR INTERNAL COMBUSTION ENGINE

[75] Inventors: Seiji Suga; Hideaki Onishi; Akio Akasaka, all of Atsugi, Japan

[73] Assignee: Atsugi Unisia Corporation, Kanagawa, Japan

[21] Appl. No.: 721,131

[22] Filed: Jun. 26, 1991

[30] Foreign Application Priority Data

| Jun. 28, 1990 | [JP] | Japan | 2-171019 |
| Jun. 28, 1990 | [JP] | Japan | 2-171020 |
| Aug. 31, 1990 | [JP] | Japan | 2-231205 |

[51] Int. Cl.⁵ ............................................. F01L 1/34
[52] U.S. Cl. .............................. 123/90.17; 123/90.31; 464/2
[58] Field of Search ............... 123/90.15, 90.17, 90.31; 464/2, 160

[56] References Cited

U.S. PATENT DOCUMENTS

| 2,907,311 | 10/1959 | Waldron | 123/90.15 |
| 4,231,330 | 11/1980 | Garcea | 123/90.15 |
| 4,535,731 | 8/1985 | Banfi | 123/90.15 |
| 5,002,023 | 3/1991 | Butterfield et al. | 123/90.17 |
| 5,012,774 | 5/1991 | Strauber et al. | 123/90.17 |
| 5,056,479 | 10/1991 | Suga | 123/90.17 |
| 5,117,785 | 6/1992 | Suga et al. | 123/90.17 |

FOREIGN PATENT DOCUMENTS

| 3810804 | 10/1989 | Fed. Rep. of Germany |
| 4041943 | 6/1991 | Fed. Rep. of Germany |
| 60-119310 | 6/1985 | Japan |
| 309704 | 12/1988 | Japan | 123/90.17 |

Primary Examiner—E. Rollins Cross
Assistant Examiner—Weilun Lo
Attorney, Agent, or Firm—Bachman & LaPointe

[57] ABSTRACT

A valve timing control system for an internal combustion engine includes a hollow sprocket rotatably supported on a camshaft, and a rotary member housed within the sprocket and rigidly connected to the camshaft for rotation therewith. The rotary member has a pair of radially extending portions, on which a pair of gears are rotatably supported. The sprocket has an internal toothed circumference which is engageable with the gears to cause the gears to rotate in accordance with rotation of the sprocket for causing relative angular displacement of the rotary member to the sprocket. The valve timing control system further includes a pair of stopper pins for regulating relative angular displacement of the intermediate rotary member to the sprocket within a predetermined maximum range, and a clutch mechanism for restricting rotation of the gears. The clutch mechanism is controlled in accordance with a current engine running condition to be associated with the stopper pins for restricting relative angular displacement of the rotary member to the sprocket.

14 Claims, 11 Drawing Sheets

VALVE TIMING CONTROL SYSTEM FOR INTERNAL COMBUSTION ENGINE

BACKGROUND OF THE INVENTION

1. Field of The Invention

The present invention relates generally to a valve timing control system for an internal combustion engine. More specifically, the invention relates to a valve timing control system for adjusting opening timing of an intake and/or an exhaust valve of an internal combustion engine in accordance with engine running condition.

2. Description of The Background Art

In recent years, various types of valve timing control systems for adjusting an opening timing of intake and exhaust valves of automotive internal combustion engines have been proposed. For example, U.S. Pat. Nos. 4,231,330 and 4,535,731 disclose a valve timing control system which generally comprises a camshaft disposed in an engine head for controlling the opening and closing of intake and exhaust valves, a cylindrical sleeve for receiving the end portion of the camshaft, and an annular piston arranged between the end portion of the camshaft and the sleeve. The cylindrical sleeve has a sprocket which engages a timing chain so that the sprocket is driven by an engine crankshaft via the timing chain. The sleeve also has an internal toothing which engages an external toothing formed on the annular piston. The annular piston is also formed with an internal toothing which engages an external toothing formed on the end portion of the camshaft. At least one of the two meshing pairs of toothing is helical to form a helical gear. The annular piston is designed to axially slide relative to the camshaft and sleeve by hydraulic pressure supplied from a hydraulic circuit and/or spring force of a compression spring, in accordance with engine running conditions. While the two pairs of toothing remain continuously engaged, the axial sliding movement of the annular piston causes the camshaft to rotate about the sprocket and consequently about the crankshaft which is connected to the sleeve by the chain, so that the opening and closing timings of the intake and exhaust valves can be controlled.

As mentioned above, in the aforementioned conventional valve timing control systems, the relative rotation of the camshaft to the sprocket is caused by the helical toothing formed on at least one of the two meshing pairs of toothing. Such a helical toothing must be very accurately processed in order to assure high accuracy of meshing of the toothing. As a result, manufacturing of the toothing becomes complicated, labor effectiveness of processing decreases and the cost thereof increases.

Furthermore, in the aforementioned conventional valve timing control systems, the helical gear extends along the axis of the camshaft and is designed to move along same, furthermore, a large space is required for receiving the valve timing control system. As a result, the size of the internal combustion engine becomes large.

SUMMARY OF THE INVENTION

It is therefore a principal object of the present invention to provide a valve timing control system for internal combustion enginee which can overcome the drawbacks of the prior art.

It is a further object of the present invention to provide a valve timing control system which may be manufactured less expensively than conventional systems and which is more compact.

According to one aspect of the present invention, a valve timing control system for an internal combustion engine comprises: a hollow rotary housing driven by an engine output and rotatably supported on a camshaft, the rotary housing having an internal toothed circumference; a rotary member housed within the rotary housing and rigidly connected to the camshaft for rotation therewith, the rotary member having a pair of radially extending portions; a pair of gears rotatably supported on the radially extending portions, and engaging the internal toothed circumference to be rotatable in accordance with rotation of the rotary housing for causing relative angular displacement of the rotary member to the rotary housing; regulating means, for regulating relative angular displacement of the rotary member to the rotary housing within a predetermined maximum range; clutch means for restricting rotation of the gears so as to be associated with the regulating means for restricting relative angular displacement of the rotary member to the rotary housing; and, control means, for controlling the clutch means in accordance with current engine running condition.

According to another aspect of the present invention, a valve timing control system for an internal combustion engine comprises; a hollow rotary housing driven by an engine output and rotatably supported on a camshaft, the rotary housing having an engaging surface on an internal surface thereof; a rotary member housed within the rotary housing and rigidly connected to the camshaft for rotation therewith, the rotary member having a pair of radially extending portions; regulating means for regulating relative angular displacement of the rotary member to the rotary housing within a maximum range; rotation restricting means arranged on the radially extending portions, and being engageable with the engaging surface so as to be associated with the regulating means to restrict relative angular displacement of the rotary member to the rotary housing; and, control means for controlling the regulating means in accordance with a current engine running condition.

BRIEF DESCRIPTION OF THE DRAWINGS

The present invention will be understood more fully from the detailed description given herebelow and from the accompanying drawings of the preferred embodiments of the invention. However, the drawings are not intended to imply limitation of the invention to a specific embodiment, but are for explanation and understanding only.

In the drawings.

DESCRIPTION OF THE PREFERRED EMBODIMENT

Figure 1:
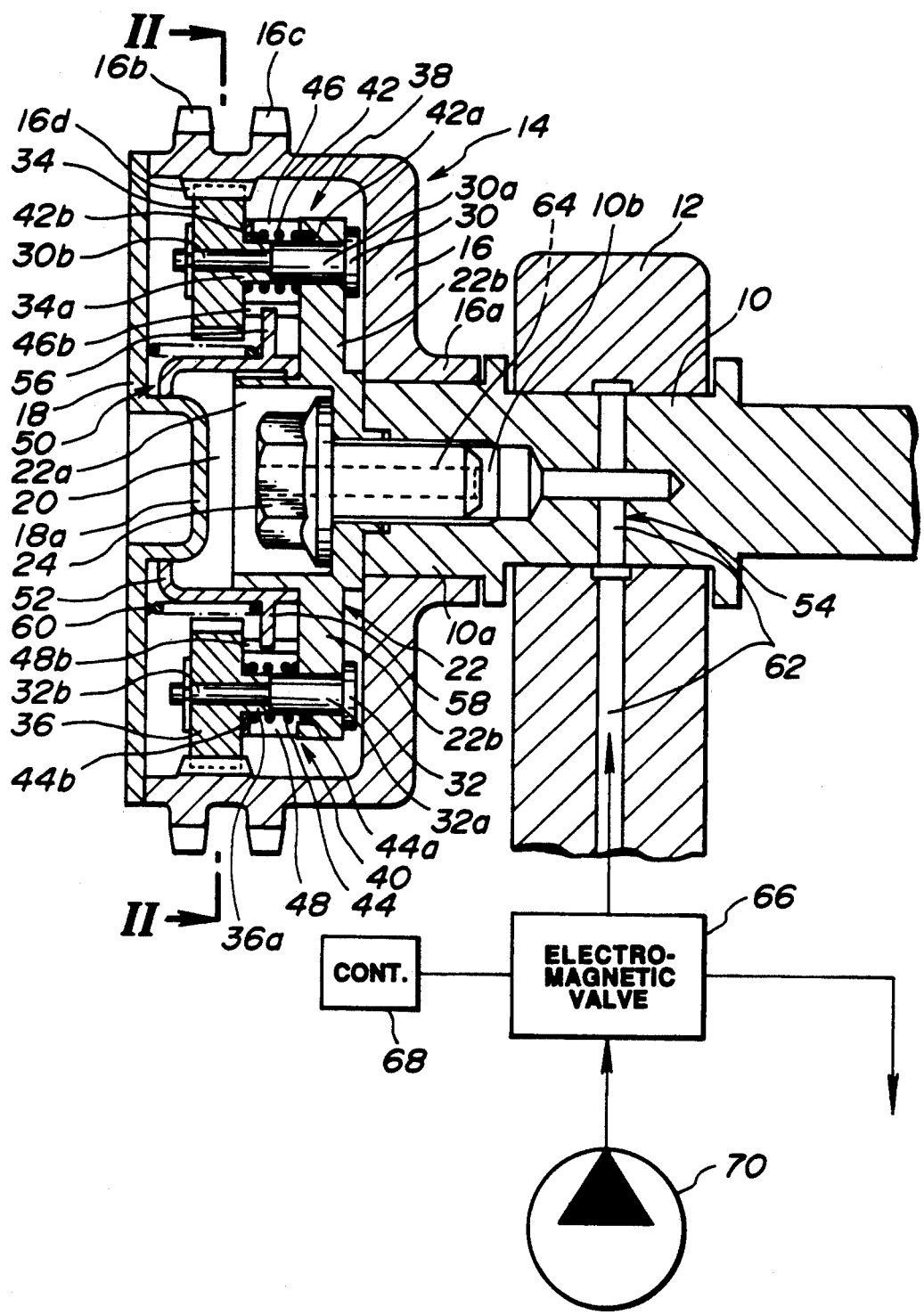
FIG. 1 is a sectional view of the first preferred embodiment of a valve timing control system, according to the present invention.
Figure 2:
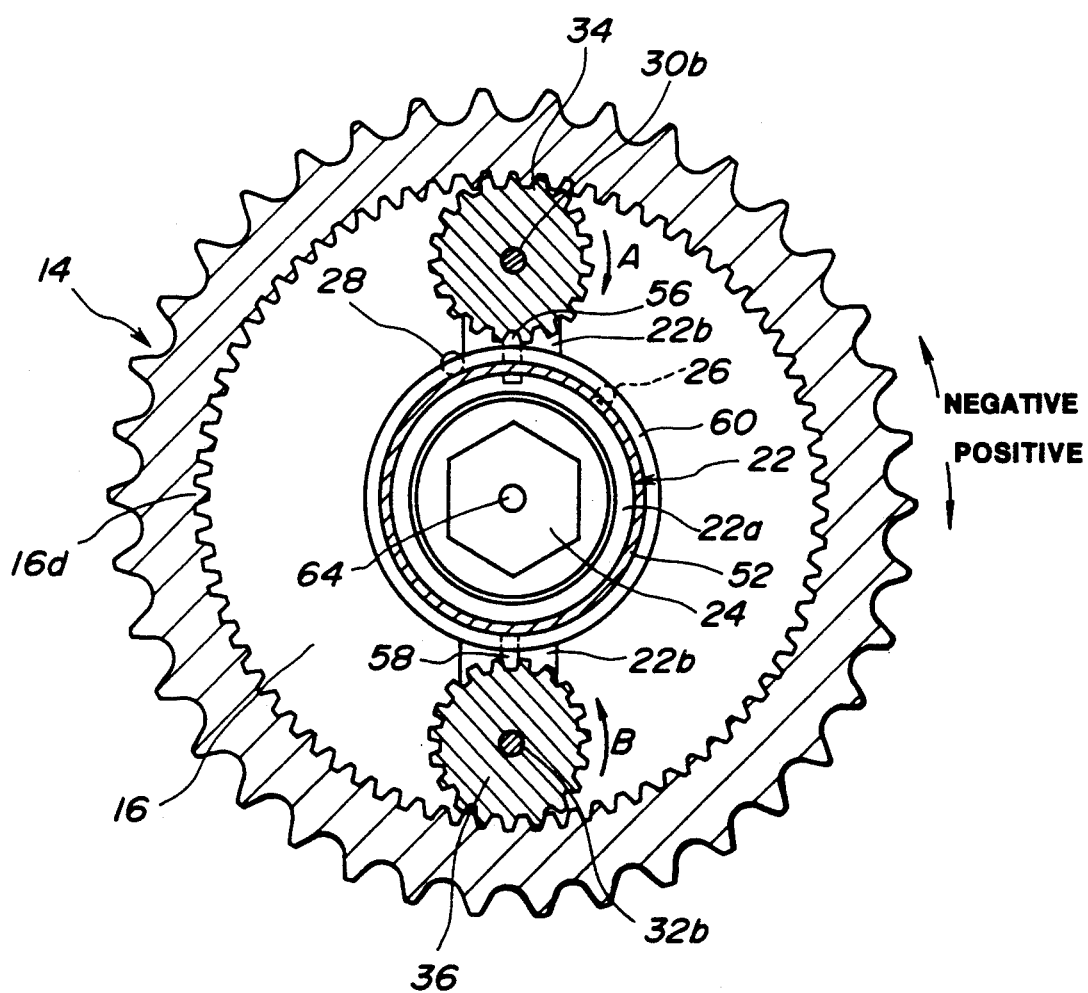
FIG. 2 is a sectional view taken along line II—II of FIG. 1.

Referring now to the drawings, particularly to FIGS. 1 to 2, there is shown the first preferred embodiment of a valve timing control system, according to the present invention, which is applied to a double overhead camshaft (DOHC) type automotive internal combustion engine.

As shown in FIG. 1, a camshaft 10 for causing the opening and closing of an intake valve (not shown) is rotatably supported on a cam bearing 12 which is arranged at the upper portion of a cylinder head.

A driven sprocket 14 is so arranged as to receive therein the end portion of the camshaft 10. The driven sprocket 14 comprises an essentially cylindrical sprocket body 16 and an essentially disc-shaped cover plate 18. The sprocket body 16 and the cover plate 18 are connected to each other by means of fastening bolts to define therein an internal space in which a pressure chamber 20 is formed. The cover plate 18 has a guiding portion 18a which projects toward the pressure chamber 20. The sprocket body 16 has a small-diameter cylindrical portion 16a which is rotatably supported on the end portion 10a of the camshaft 10. In addition, the sprocket body 16 is integrally formed with two rows of external annular gear teeth portions 16b and 16c which are arranged on the outer periphery of the sprocket body 16 in parallel to each other, separated by a predetermined distance. These external gear teeth portions 16b and 16c engage a timing chain (not shown) which also engages a driving sprocket secured to a crankshaft (not shown) for transmitting rotational force from the crankshaft to the driven sprocket 14. The sprocket body 16 is also integrally formed with an internal annular gear teeth portion 16d on the inner periphery thereof.

An intermediate rotary member 22 is disposed within the internal space of the driven sprocket 14. As can be seen clearly from FIG. 2, the intermediate rotary member 22 comprises an essentially cylindrical base portion 22a and a pair of elongated arm portions 22b which extend from opposing locations on the base portion 22a in a direction perpendicular to the axis of the camshaft 10. The base portion 22a is secured to the end portion 10a of the camshaft 10 by causing a fastening bolt 24 to engage a screwed opening 10b which is formed in the end portion 10a of the camshaft 10 to extend in a direction of the axis of the camshaft 10. Since the intermediate rotary member 22 is secured to the end portion 10a of the camshaft, it is allowed to rotate relative to the driven sprocket 14 rotatably supported on the end portion 10a of the camshaft 10. However, the maximum allowable rotational range of the intermediate rotary member 22 relative to the driven sprocket 14 is limited by first and second stopper pins 26 and 28 which project from the internal surface of the sprocket body 16 to extend in a direction parallel to the axis of the camshaft 10. A pair of supporting shafts 30 and 32 are secured to the free end portions of the arm portions 22b. These supporting shafts 30 and 32 extend in a direction parallel to the axis of the camshaft 10, and comprise large-diameter portions 30a and 32a, and small-diameter portions 30b and 32b, respectively.

The small-diameter portions 30b and 32b or the supporting shafts 30 and 32 rotatably support thereon first and second gears 34 and 36, respectively. The first and second gears 34 and 36 respectively have cylindrical portions 34a and 36a which have essentially the same outer diameter as that of the large-diameter portion 30a and 32a of the supporting shafts 30 and 32. The cylindrical portions 34a and 36a are so arranged as to be respectively in coaxial contact with the corresponding large-diameter portions 30a and 32a.

The rotations of the first and second gears 34 and 36 are regulated by means of first and second one-way type clutch mechanisms 38 and 40. The first and second clutch mechanisms 38 and 40 respectively comprise first and second clutch springs 42 and 44, and essentially cylindrical first and second working members 46 and 48. The first and second clutch springs 42 and 44 are respectively wound onto the large-diameter portions 30a and 32a, and consecutively onto the cylindrical portions 34a and 36a. The first and second cylindrical working members 46 and 48 are respectively arranged around the corresponding clutch springs 42 and 44 to be separated therefrom by a predetermined distance, and rotatably supported between the corresponding gear 34 or 36 and the corresponding arm portion 22b of the intermediate rotary member 22. The first and second clutch springs 42 and 44 are wound in a reverse direction to each other. Ends 42a and 44a of the first and second clutch springs 42 and 44 are respectively connected to the corresponding arm portions 22b of the intermediate rotary member 22, and the other ends 42b and 44b thereof are respectively connected to the outer end portions of the corresponding working members 46 and 48. As can be seen clearly from FIGS. 3A, 3B, 4A and 4B, the respective working members 46 and 48 are integrally formed with rising portions 46a and 48a which gradually rise on the circumferential surface in opposite directions. The rising portions 46a and 48 respectively have first and second tapered surfaces 46b and 48b which extend in a direction perpendicular to the circumferential surface of the corresponding working members 46 and 48 to be inclined relative to the axis of the corresponding working members 46 and 48.

The rotational movement of the working members 46 and 48 are controlled by a switching mechanism 50. The switching mechanism 50 generally comprises an essentially cylindrical sliding member 52 which is slidable within the sprocket body 16 in a direction of the axis of the camshaft 10, and a hydraulic circuit 54 which supplies hydraulic pressure to the interior of the pressure chamber 20 for urging the sliding member 52 to the left direction of FIG. 1. One open end portion of the sliding member 52 is inwardly bent to form a flange portion which is in contact with the guiding portion 18a of the cover plate 18 to be slidable thereon. The inner periphery of the other open end portion of the sliding member 52 is in contact with the outer periphery of the base portion 22a of the intermediate rotary member 22 to be slidable thereon. In addition, first and second thrusting pins 56 and 58 extend radially from the outer periphery of the other open end portion of the sliding member 52. As can be seen clearly from FIGS. 3A, 3B, 4A and 4B, the end portions of the first and second thrusting pins 56 and 58 are designed to push the corresponding tapered surfaces 46b and 48b of the working members 46 and 48 in accordance with the axial movement of the sliding member 52. When the sliding member 52 moves to the left, the first thrusting pin 56 pushes the first tapered surface 46b to cause the first working member 46 to rotate in the clockwise direction of FIG. 3B, which causes the first clutch spring 42 to become loose. On the other hand, when the sliding member 52 moves in the right direction (FIG. 1), the second thrusting pin 58 pushes the second tapered surface 48b to cause the second working member 48 to rotate in the counterclockwise direction of FIG. 4B, which causes the second clutch spring 44 to become loose. The sliding member 52 is biased to the right in FIG. 1 by means of a coil spring 60 provided between the cover plate 18 and the thrusting pins 56 and 58. That is, the sliding member 52 is biased so that the second thrusting pin 58 pushes the second tapered surface 48b to cause the second working member 48 to rotate counterclockwise so as to cause the second clutch spring 44 to become loose.

The hydraulic circuit 54 includes a first fluid passage 62 which branches from a main oil gallery (not shown) to pass through the cam bearing 12 to extend in the radial direction of the camshaft 10, and a second fluid passage 64 which extends in a direction of the axis of the camshaft 10 to establish fluid communication between the first fluid passage 62 and the pressure chamber 20. In addition, an electromagnetic valve 66 is arranged upstream of the first fluid passage 62. The electromagnetic valve 66 is controlled by an electronic controller 68 which detects the current engine running condition on the basis of output signals from a crank angle sensor, an air flow meter (not shown) and so forth, to output an ON or OFF signal to the electromagnetic valve 66. When the controller 68 outputs an ON signal to the electromagnetic valve 66, the electromagnetic valve 66 opens to allow hydraulic pressure to be supplied from an oil pump 70 to the pressure chamber 20. On the other hand, when the controller 68 outputs an OFF signal to the electromagnetic valve 66, it is closed to prevent hydraulic pressure to be supplied to the pressure chamber 20.

The operation of the valve timing control system, according to the present invention, is described below.

Figure 3A:
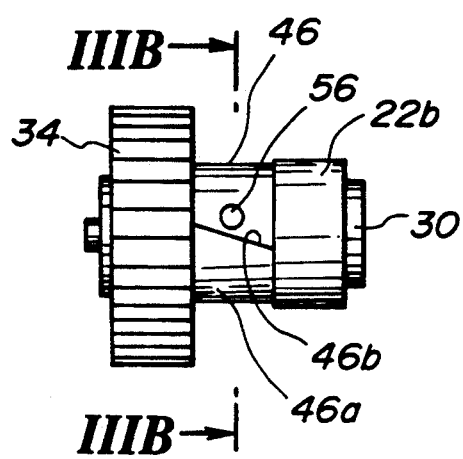
FIG. 3A is a view showing a first clutch mechanism of the valve timing control system of FIG. 1.
Figure 3B:
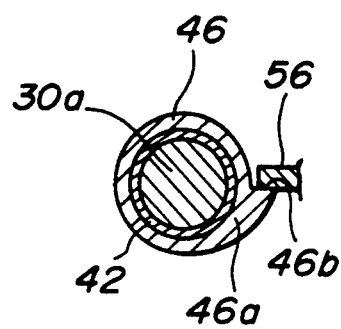
FIG. 3B is a sectional view taken along line TTTR—TTTB of FIG. 3A.
Figure 4A:
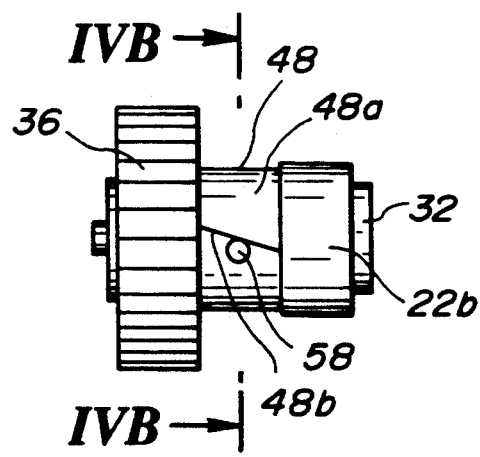
FIG. 4A is a view showing relationship between a second clutch mechanism of the valve timing control system of FIG. 1.
Figure 4B:
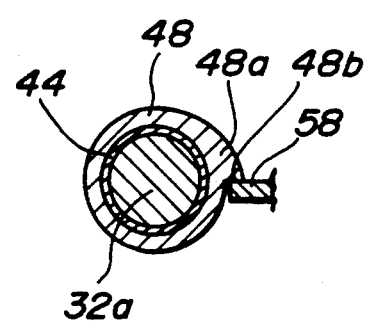
FIG. 4B is a sectional view taken along line IVB—IVB of FIG. 4A.

When, for example, the engine operates in a low load running condition, the controller 68 outputs an OFF signal to the electromagnetic valve 66, so that hydraulic pressure is prevented from being supplied from the oil pump 70 to the pressure chamber 20, thereby the sliding member 52 moves to the rightmost position of FIG. 1 by spring force of the coil spring 60. As a result, as shown in FIGS. 4A and 4B, the second thrusting pin 58 pushes the second tapered surface 48b to cause the second working member 48 to rotate counterclockwise in FIG. 4B, so that the second clutch spring becomes loose to allow the second gear 36 to rotate in both of forward and reverse directions. At this time, as shown in FIGS. 3A and 3B, since the first thrusting pin 56 is separated from the first tapered surface 46a to provide no effect to the first working member 46, the cylindrical portion 34a of the first gear 34 and the large-diameter portion 30a of the supporting shaft 30 are tightly bound by the spring force of the first clutch spring 42 and thus connected to each other. As a result, although the first gear 34 is allowed to rotate in a direction in which the first clutch spring 42 becomes loose, i.e. in a direction of the arrow A in FIG. 2, it is prevented from rotating in the opposite direction. Therefore, if positive rotational torque, produced when the intake valve is closed, is applied to the camshaft 10, the first gear 34 is restricted from rotating in the counterclockwise direction of FIG. 2 by the first clutch spring 42. On the other hand, when negative rotational torque is applied to the camshaft 10, the first gear 34 is restricted from rotating in the clockwise direction of FIG. 2 by the second stopper pin 28. Therefore, the camshaft 10 is restricted from rotating in both of positive and negative directions by means of the intermediate rotary member 22, so that the camshaft 10 remains held at a position in which the arm portion 22b is in contact with the second stopper pin 28. As a result, the camshaft 10 is held at a rotational position in which the closing timing of the intake valve is delayed.

On the other hand, when the engine running condition becomes a high load running condition, the electromagnetic valve 66 is turned ON to supply working fluid to the pressure chamber 20 from the oil pump 70 via the first and second fluid passages 62 and 64, so that pressure within the pressure chamber 20 is raised immediately. Therefore, the sliding member 52 is moved to the left direction of FIG. 1 due to the high hydraulic pressure within the pressure chamber 20, which overcomes the spring force of the coil spring 60, so that the first thrusting pin 56 pushes the first tapered surface 46b, thereby the first working member 46 rotates in the clockwise direction of FIG. 3B. As a result, the first clutch spring 42 allows the first gear 34 to rotate in both positive and negative directions. At this time, since the second thrusting pin 58 is separated from the second tapered surface 48b of the second working member 48, the cylindrical portion 36a of the second gear 36 and the large-diameter portion 32a of the supporting shaft 32 are tightly bound by the second clutch spring 44 to be connected to each other. Therefore, although the second gear 36 is allowed to rotate in a direction in which the second clutch spring 44 becomes loose, i.e. in the direction of the arrow B in FIG. 2, it is prevented from rotating clockwise. In this state, when positive rotational torque is applied to the camshaft 10, the camshaft 10 is allowed to rotate in the positive direction until the arm portion 22b of the intermediate rotary member 22 comes into contact with the first stopper pin 26. At this position, if negative rotational torque is applied to the camshaft 10, the camshaft 10 is restricted from rotating in both of positive and negative directions by the second gear 34 which is restricted from rotating clockwise, and by the first stopper pin 26. As a result, the camshaft 10 is held at a rotational position in which the closing timing of the intake valve is advanced.

Furthermore, when the engine running condition varies from a high load running condition to a low load running condition, hydraulic pressure within the pressure chamber 20 is discharged to the outside via the electromagnetic valve 66.

According to the present invention, another switching mechanism may be substituted for the switching mechanism 50. For example, the sliding member 52 may be directly driven by an electromagnetic actuator.

FIGS. 5 to 8 show the second preferred embodiment of a valve timing control system, according to the present invention. Similarly to the former embodiment, a camshaft 100 is rotatably supported on an cam bearing 102. A drive sprocket 104 is arranged so as to receive therein the end portion of the camshaft 100. The driven sprocket 104 comprises an essentially cylindrical sprocket body 106 and an essentially disc-shaped cover plate 108 for covering an open end of the sprocket body 106 to define therein an internal space. The other end wall 106a of the sprocket body 106 is formed with a small-diameter cylindrical portion 106b which is rotatably supported on the end portion 100a of the camshaft 100. In addition, the sprocket body 106 is integrally formed with two rows of external annular gear teeth, gear teeth portions 106c and 106d, which are arranged on the outer periphery of the sprocket body 106 in parallel to each other separated by a predetermined distance. These external gear teeth portions 106c and 106d engage a timing chain (not shown) which also engages a driving sprocket secured to a crankshaft (not shown) for transmitting rotational force from the crankshaft to the driven sprocket 104. As can be seen clearly from FIG. 7, the sprocket body 106 is also integrally formed with a pair of substantially wedge-shaped projections 110 and 112 on the inner periphery thereof. The innermost, axially facing surfaces of the respective wedge-shaped projections 110 and 112 are formed with first and second curved, inclined surfaces 110a and 112a which gradually incline from the inner circumference of the driven sprocket 104 to respective peak points 110b and 112b closest to the rotational axis. The surfaces 110a and 112a incline in directions opposite to each other. That is, the first and second inclined surfaces 110a and 112a are inclined such that the heights thereof decrease gradually from the right side to the left side in FIG. 7.

Figure 7:
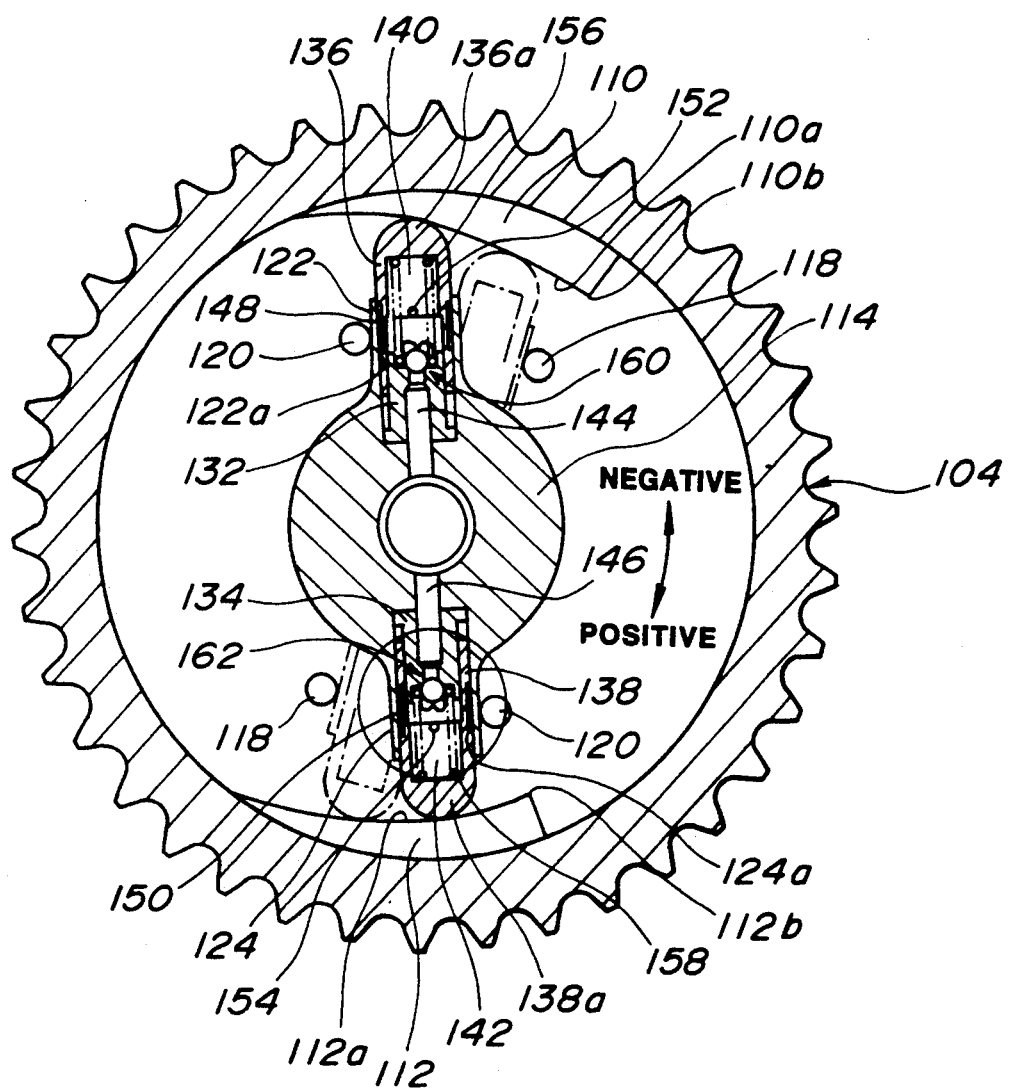
FIG. 7 is a sectional view taken along line VII—VII of FIG. 5.
Figure 8:
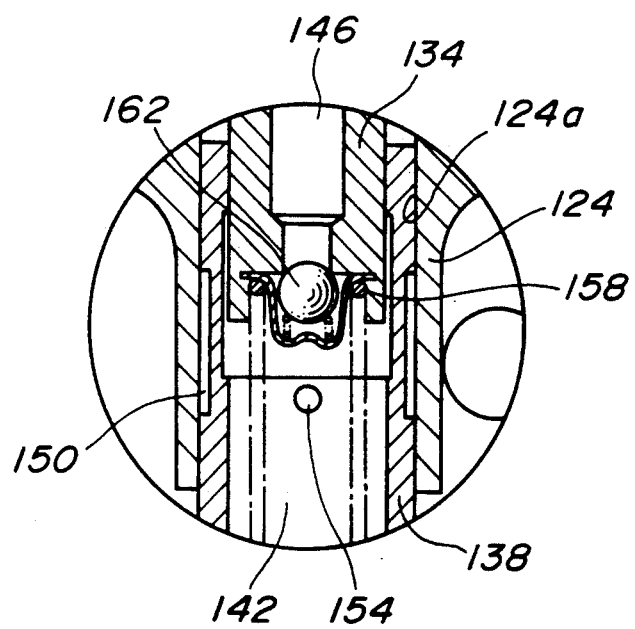
FIG. 8 is an enlarged view of the portion A of FIG. 7.

An essentially cylindrical intermediate rotary member 114 is disposed within the internal space of the driven sprocket 104. The intermediate rotary member 114 is secured to the end portion 100a of the camshaft 100 by causing a fastening bolt 116 to engage a through opening 114a which passes through the intermediate rotary member 114, and a threaded opening 100b which is formed in the end portion 100a of the camshaft 100 to extend in a direction of the axis of the camshaft 100. Since the intermediate rotary member 114 is secured to the end portion 100a of the camshaft 100, it is allowed to rotate relative to the driven sprocket 104 rotatably supported on the end portion 100a of the camshaft 100. However, as shown in FIG. 7, the maximum allowable rotational range of the intermediate rotary member 114 relative to the driven sprocket 104 is limited by first and second stopper pins 118 and 120 which project from the inner surface of the other end wall 106a of the sprocket body 106 to extend in a direction parallel to the axis of the camshaft 100.

The intermediate rotary member 114 has a pair of projections 122 and 124 which extend radially from the outer periphery thereof in opposite directions. These projections 122 and 124 have respective openings 122a and 124a which extend in a direction of the axis of the rotary member 114. The openings 122a and 124a respectively receive therein hydraulic locking mechanisms 126 and 128 which are driven by hydraulic pressure from a hydraulic circuit 130. The hydraulic locking mechanisms 126 and 128 generally comprise essentially cylindrical retainers 132 and 134, and essentially cylindrical first and second plungers 136 and 138, respectively. The retainers 132 and 134 are respectively received in the openings 122a and 124a to be secured to the bottoms thereof. The first and second plungers 136 and 138 are respectively arranged between the inner periphery of the opening 123a and the outer periphery of the retainer 132, and between the inner periphery of the opening 124a and the outer periphery of the retainer 134, so as to be movable in a direction of the axis thereof. The first and second plungers 136 and 138 are associated with the corresponding retainers 132 and 134 to define first and second high-pressure chambers 140 and 142, respectively. The retainers 132 and 134 respectively have fluid passages 144 and 146, each of which extends along the axis thereof for supplying working fluid to the corresponding high-pressure chambers 140 and 142 from an oil pump 147 via the hydraulic circuit 130. The outer peripheries of the plungers 136 and 138 are formed with annular discharge grooves 148 and 150, respectively. At the end portions of the respective plungers 136 and 138, hemispherical thrusting portions 136a and 138a for thrusting corresponding inclined surfaces 110a and 112a are formed. In the circumferential walls of the respective plungers 136 and 138, small holes 152 and 154 are formed for establishing a fluid communication between the annular discharge groove 148 or 150 and the high-pressure chamber 140 or 142. The respective plungers 136 and 138 are biased toward the corresponding inclined surfaces 110a and 112a by means of compression springs 156 and 158 disposed within the high-pressure chambers 140 and 142. In addition, one end of each of the fluid passages 144 and 146 are provided with one way check valves 160 and 162 for allowing fluid in the fluid passages 144 and 146 to be introduced only into the corresponding high-pressure chambers 140 and 142.

Figure 5:
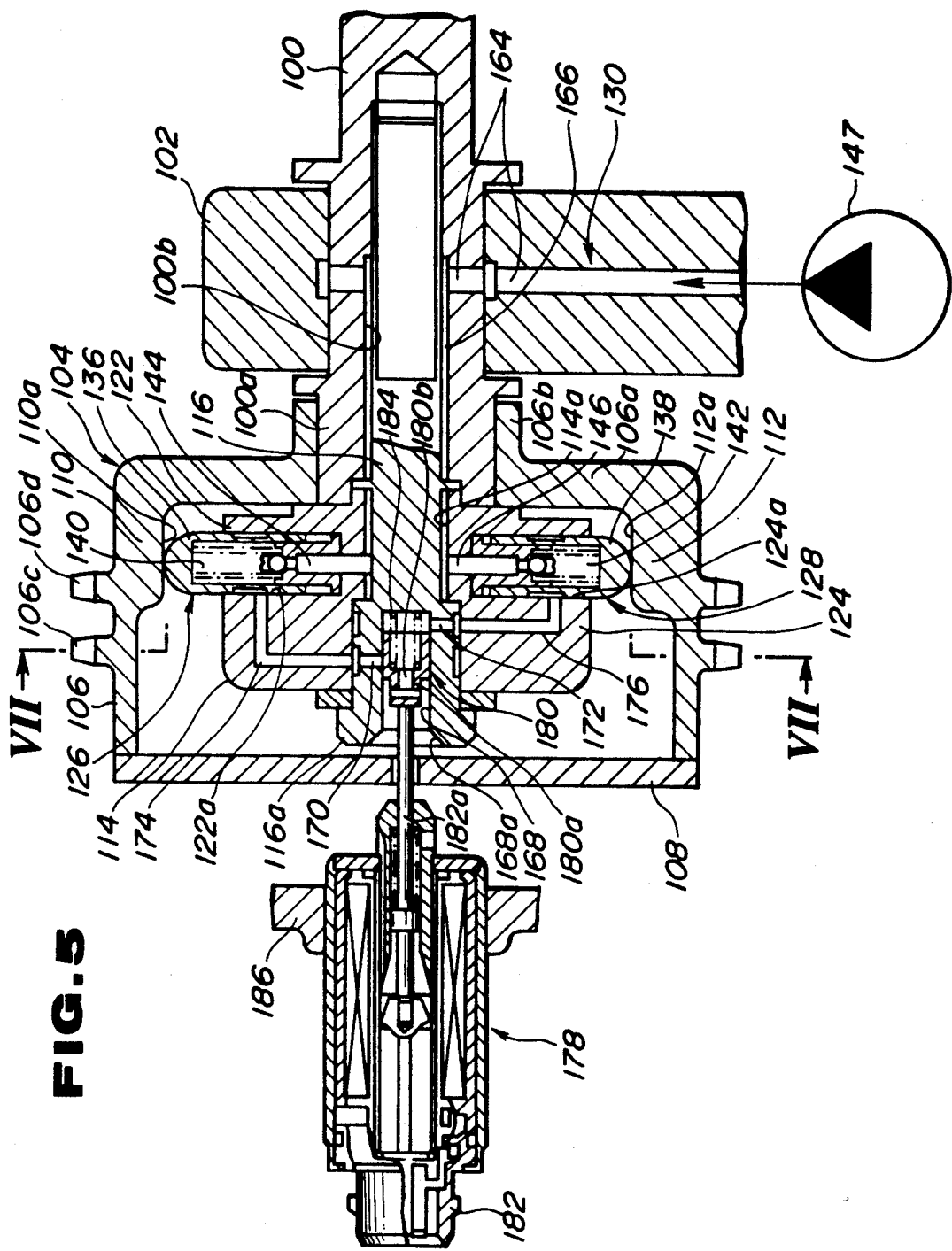
FIGS. 5 and 6 are sectional views of the second preferred embodiment of a valve timing control system, according to the present invention.
Figure 6:
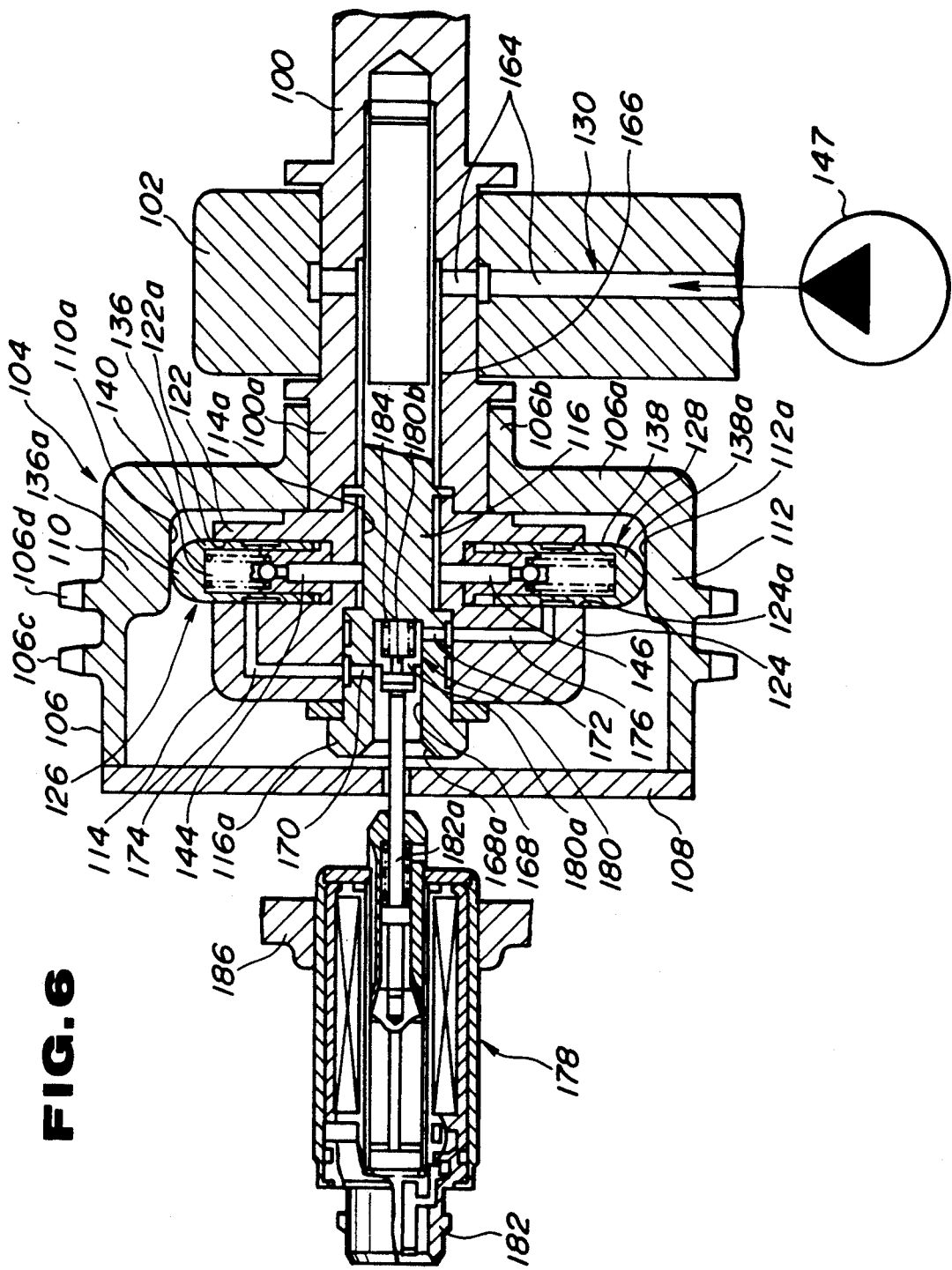

As shown in FIGS. 5 and 6, the hydraulic circuit 130 includes a main fluid passage 164 which branches from main oil gallery (not shown) to pass through the cam bearing 102 to extend in the radial direction of the camshaft 100, and an annular fluid passage 166 which is formed between the fastening bolt 116 and the threaded opening 100b of the camshaft 100 to establish fluid communication between the main fluid passage 164 and the fluid passages 144 and 146. In addition, the hydraulic circuit 130 includes a control chamber 168 formed in the head portion 116a of the fastening bolt 116. The control chamber 168 communicates with first and second ports 170 and 172 radially extending for establishing fluid communication between the control chamber 168 and the outside thereof. The first and second ports 170 and 172 respectively communicate with the annular discharge grooves 148 and 150 via L-shaped discharge passages 174 and 176. The control chamber 168 has an open end 168a which opens to the outside thereof. The discharge-side passages of the hydraulic circuit 130 are designed to be controlled by switching means 178.

The switching means 178 generally comprises a spool valve 180 which is slidable within the control chamber 168 in an axial direction axis thereof, and an electromagnetic actuator 182 for causing the spool valve 180 to move to the right in FIGS. 5 and 6 against spring force of a coil spring 184. The spool valve 180 comprises an essentially cylindrical valve body 180a which is connected to the end of a driving rod 182a of the electromagnetic actuator 182 and which defines therein an internal space. The valve body 180a has an essentially T-shaped fluid passage 180b for selectively communicating the first or second ports 170 or 172 with the outside in accordance with the movement of the valve body 180a.

The electromagnetic actuator 182 is secured to a rocker cover 186, and is controlled on the basis of an ON-OFF signal from a controller (not shown) including a microcomputer. This controller detects the current engine running condition on the basis of output signals from a crank angle sensor, an air flow meter (not shown) and so forth, to output a control signal to the electromagnetic actuator 182.

The operation of this embodiment of the valve timing control system, according to the present embodiment, is described below.

When for example, the engine operates in a low load running condition, the controller outputs OFF signal to the electromagnetic actuator 182, so that the spool valve 180 is held at the left position as shown in FIG. 5 by the spring force of the coil spring 184. In this position, the valve body 180a opens the second port 172 to establish fluid communication between the second high-pressure chamber 142 outside thereof, and to block fluid communication between the first high-pressure chamber 140 and the outside. Therefore, working fluid which is supplied to the first and second high-pressure chambers 140 and 142 from the oil pump 147 via the main fluid passage 164, the annular fluid passage 166, the fluid passages 144 and 146, and the check valves 160 and 162, remains only in the first high-pressure chamber. That is, the working fluid supplied to the second high pressure chamber 142 is discharged to the outside via the small hole 154, the discharge groove 150, the discharge passage 176, the second port 172, the control chamber 168 and the fluid passage 180b. As a result, the thrusting portion 138a of the second plunger 138 pushes the second inclined surface 112a with only small spring force of the compression spring 158. On the other hand, the thrusting portion 136a of the first plunger 136 pushes a lower portion of the first inclined surface 110a with a strong composite force of the spring force of the compression spring 156 and the hydraulic pressure within the first high-pressure chamber 140. In this condition, if clockwise rotational force in FIG. 7 (positive rotational torque) is applied to the camshaft 100, the first plunger 136 is restricted from moving to the higher portions of the inclined surface 110a since the first plunger 136 strongly pushes the inclined surface 110a by the composite force, so that positive rotation of the camshaft 100 is restricted. On the other hand, negative rotation of the camshaft 100 is restricted by the second stopper pin 120 which is in contact with the arm portions 122 and 124 of the intermediate rotary member 114. Therefore, relative rotational position of the camshaft 100 to the driven sprocket 104 is surely held at the position as shown by the full line of FIG. 7, so that the camshaft 100 is hold at a rotational position in which the closing timing of the intake valve is delayed.

On the other hand, when the engine running condition changes to a high load running condition, the controller outputs an ON signal to the electromagnetic actuator 182 to cause the spool valve 180 to move to the right as shown in FIG. 6 against the spring force of the coil spring 184, so that the first port 170 is open while the second port 172 is closed. Therefore, the thrusting portion 138a of the second plunger 138 pushes the second inclined surface 112a with a composite force of the spring force of the compression spring 158 and the hydraulic pressure within the second high-pressure chamber 142. On the other hand, the thrusting portion 136a of the first plunger 136 pushes the first inclined surface 110a only with spring force of the compression spring 156. Therefore, in this condition, if positive rotational torque is applied to the camshaft 100, the camshaft rotates in a positive direction until it comes into contact with the first stopper pin 118 as shown by the dotted line of FIG. 7. At this position, if negative rotational torque is applied to the camshaft 100, negative rotation of the camshaft 100 is restricted since the thrusting portion 138a of the second plunger 138 strongly pushes the lower portion of the second inclined surface 112a. On the other hand, positive rotation of the camshaft 100 is restricted by the stopper pins 118. Therefore, relative rotational position of the camshaft 100 to the driven sprocket 104 is therefore surely held at the position as shown by the dotted line of FIG. 7, so that the camshaft 100 is held at a rotational position in which the closing timing of the intake valve is advanced.

Furthermore, when the engine running condition varies from a high load running condition to a low load running condition, the camshaft 100 rotates in a negative direction until it is restricted by the stopper pins 120, and then, positive rotation of the camshaft is surely restricted by the thrusting force of the first plunger 136.

FIGS. 9 to 12 show the third preferred embodiment of a valve timing control system, according to the present invention. Similarly to the former embodiments, a camshaft 200 is rotatably supported on an cam bearing 202. A driven sprocket 204 is so arranged as to receive therein the end portion of the camshaft 200. The driven sprocket 204 comprises an essentially cylindrical sprocket body 206 and an essentially disc-shaped cover plate 208 for covering an open end of the sprocket body 206 to define therein an internal space. The other end wall 206a of the sprocket body 206 is formed with a small-diameter cylindrical portion 206b which is rotatably supported on the end portion 200a of the camshaft 200. In addition, the sprocket body 206 is integrally formed with two rows of external annular gear teeth portions 206c and 206d which are arranged on the outer periphery of the sprocket body 206 in parallel to each other separated by a predetermined distance. These external gear teeth portions 206c and 206d engage a timing chain (not shown) which also engages a driving sprocket secured to a crankshaft (not shown) for transmitting rotational force from the crankshaft to the driven sprocket 204.

An intermediate rotary member 210 is disposed within the internal space of the driven sprocket 204. The intermediate rotary member 210 is secured to the end portion 200a of the camshaft 200 by causing a fastening bolt 212 to engage a through opening 210a which passes through the intermediate rotary member 210, and a threaded opening 200b which is formed in the end portion 200a of the camshaft 200 and which extends in a direction of the axis of the camshaft 200. Since the intermediate rotary member 210 is secured to the end portion 200a of the camshaft 200, it is allowed to rotate relative to the driven sprocket 204 rotatably supported on the end portion 200a of the camshaft 200. However, as shown in FIG. 11, the maximum allowable angular range of the rotation of the intermediate rotary member 210 relative to the driven sprocket 204 is limited by first and second stopper pins 214 and 216 which project from the inner surface of the other end wall 206a of the sprocket body 206 to extend in a direction parallel to the axis of the camshaft 200.

Figure 11:
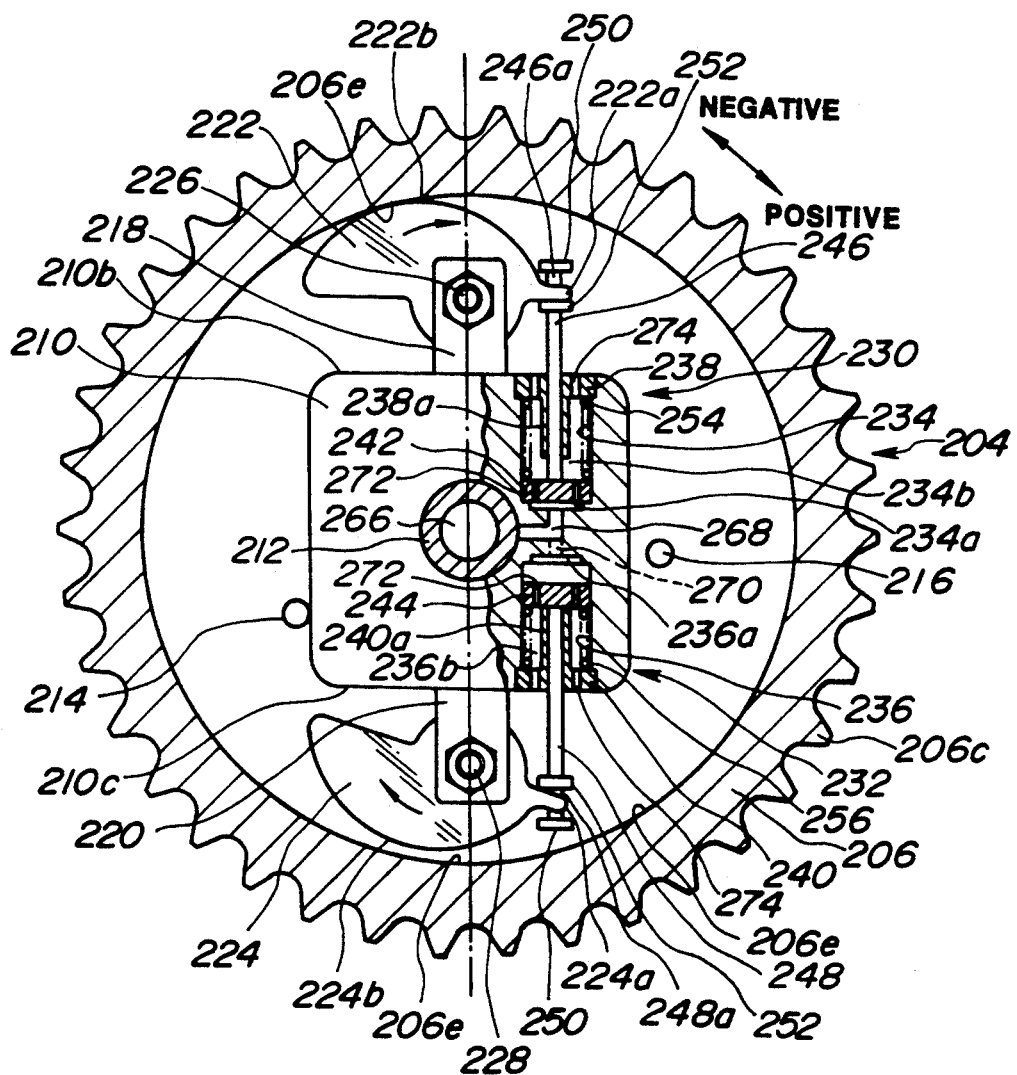
FIGS. 11 and 12 are sectional views taken along line XI—XI of FIG. 9.

As shown in FIG. 11, the intermediate rotary member 210 has a pair of brackets 218 and 220 which project in a radial direction of the camshaft 200 from essentially the central portions of upper and lower surfaces 210b and 210c thereof. The brackets 218 and 220 respectively have a substantially T-shaped cross-section. In addition, supporting shafts 226 and 228 are fixed to corresponding brackets 218 and 220, and substantially semicircular first and second cam members 222 and 224 are rotatably and eccentrically supported thereon. The cam members 222 and 224 are caused to rotate by means of driving means 230 and 232, respectively. The respective cam members 222 and 224 are integrally formed with supporting rings 222a and 224a at one end portion thereof, respectively.

The driving means 230 and 232 respectively comprise cylinder grooves 234 and 236 which are formed in the intermediate rotary member 210 on upper and lower surfaces 210b and 210c, disc-shaped lid members 238 and 240 which close the open end of corresponding cylinder grooves 234 and 236, disc-shaped pistons 242 and 244 which are slidably received within corresponding cylinder grooves 234 and 236 for respectively dividing the corresponding cylinder grooves 234 and 236 into first hydraulic chamber 234a and first atmospheric chamber 234b and second hydraulic chamber 236a and second atmospheric chambers 236b, and working rods 246 and 248, one end of each of which are connected to corresponding pistons 242 and 244. The lid members 238 and 240 are integrally formed with essentially cylindrical small-diameter regulating members 238a and 240a which project inwardly from the inner surfaces of the lid members 238 and 240 for defining maximum allowable movements of the pistons 242 and 244 toward the atmospheric chambers 234b and 236b. The other ends 246a and 248a of the working rods 246 and 248 pass through the regulating members 238a and 240a and lid members 238 and 240, to be connected to the supporting rings 222a and 224a of the cam members 222 and 224 by means of stopper members 250 and 252. The pistons 242 and 244 are designed to be biased toward the hydraulic chambers 234a and 236a by compression springs 254 and 256 provided in the atmospheric chambers 234b and 236b, and to be caused to move toward the atmospheric chambers 234b and 236b by hydraulic pressure within the hydraulic chambers 234a and 236a from an oil pump 258 via a hydraulic circuit 260.

Figure 9:
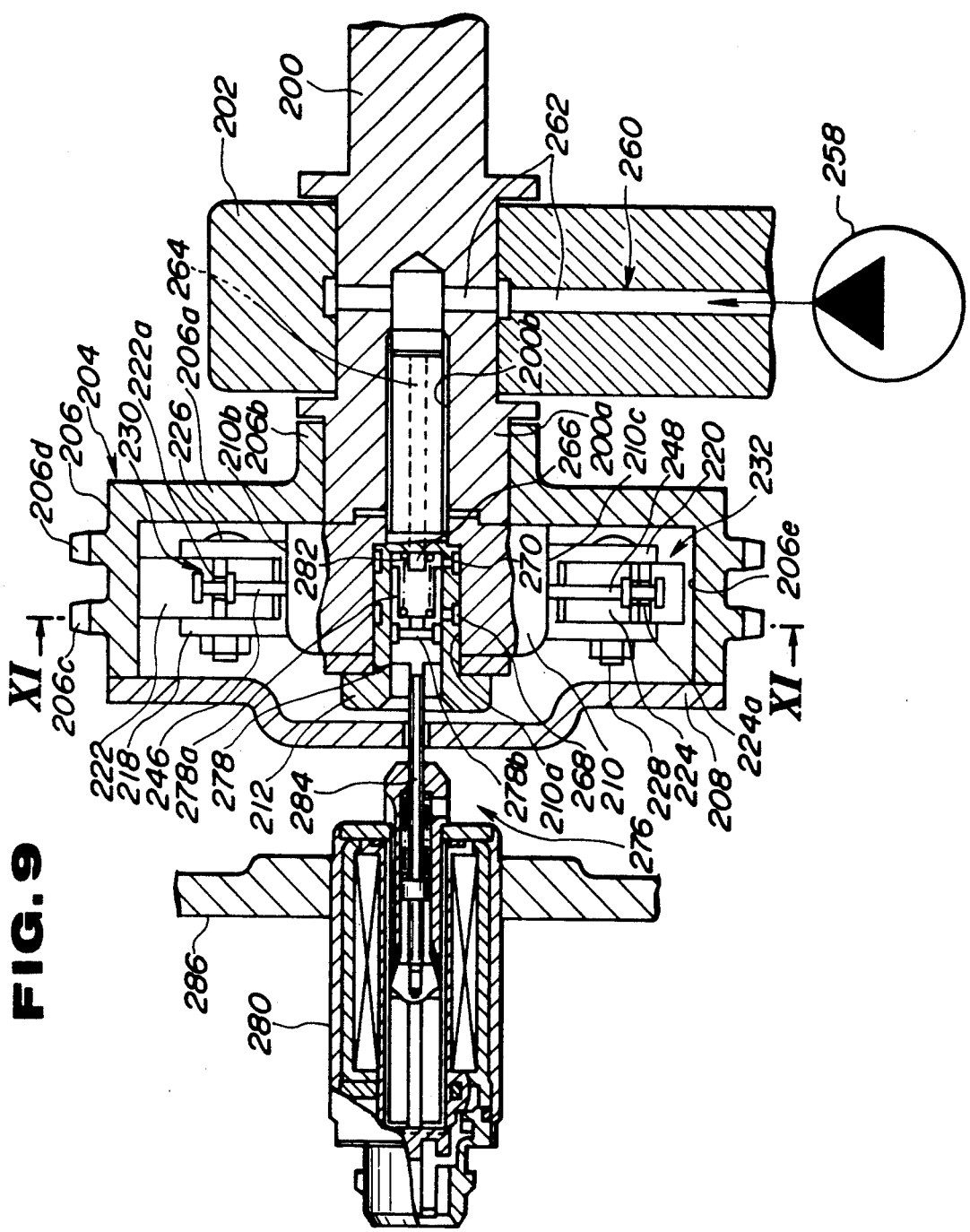
FIGS. 9 and 10 are sectional views of the third preferred embodiment of a valve timing control system, according to the present invention.

As shown in FIG. 9, the hydraulic circuit 260 includes a main fluid passage 262 which branches from an main oil gallery (not shown) to pass through the cam bearing 202 to extend in the radial direction of the camshaft 200, a fluid passage 264 which passes through the fastening bolt 212 to communicate with the main fluid passage 262, a control chamber 266 which is formed in the head portion of the fastening bolt 212 to communicate with the fluid passage 264, and essentially L-shaped first and second fluid passages 268 and 270 which are formed in the head portion of the fastening bolt 212 and the intermediate rotary member 210 to establish fluid communication between the control chamber 266 and the respective hydraulic chambers 234a and 236a. In addition, the working fluid within the hydraulic chambers 234a and 236a are discharged to the outside via a plurality of orifices 272 and 274 formed in the pistons 242 and 244 and in the lid members 238 and 240. The hydraulic circuit 260 are designed to be controlled by switching means 276.

Figure 10:
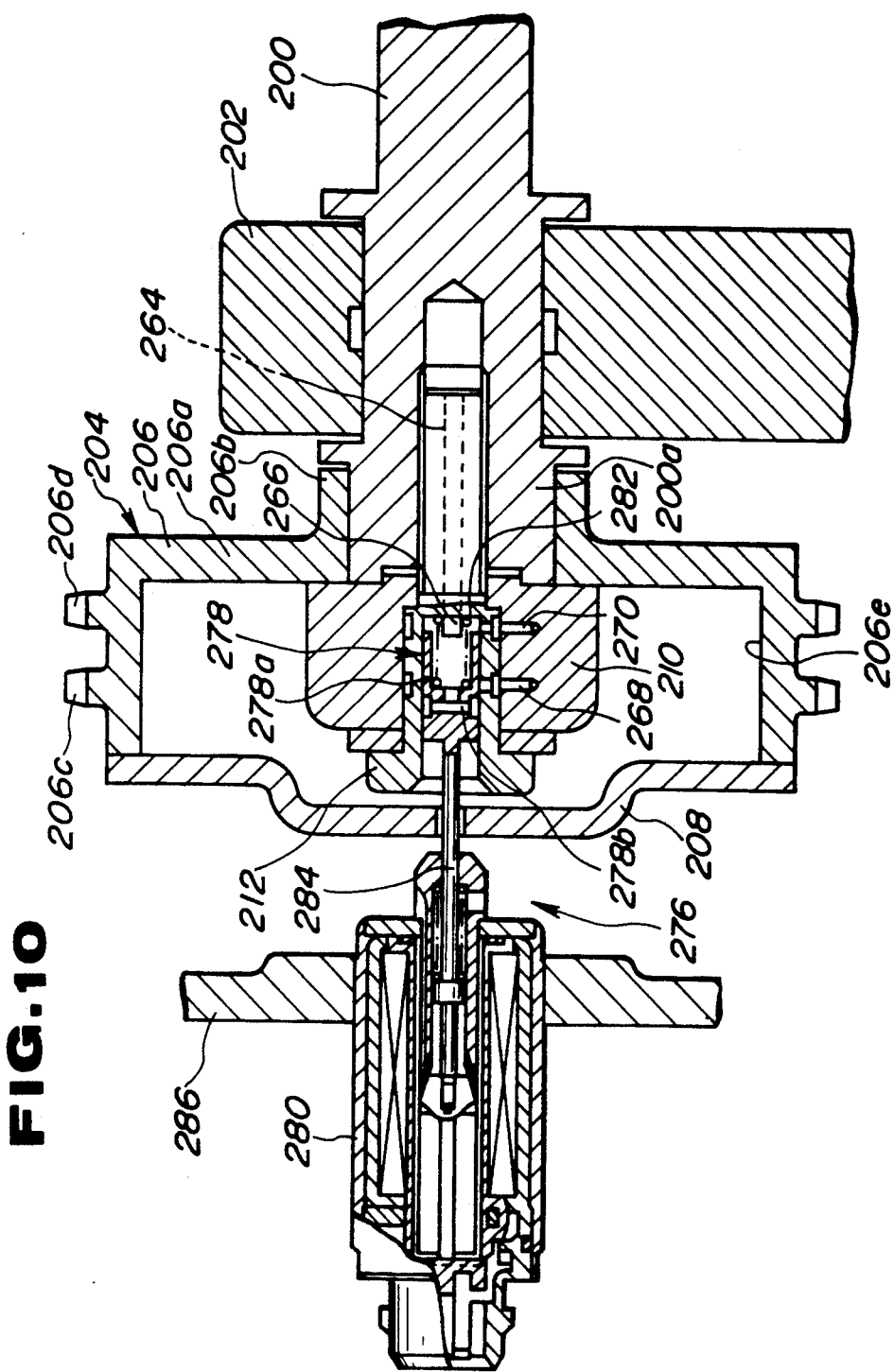

The switching means 276 generally comprises a spool valve 278 which is slidable within the control chamber 266 in a direction of the axis thereof, and an electromagnetic actuator 280 for causing the spool valve 278 to move to the right in FIGS. 9 and 10 against spring force of a coil spring 282. The spool valve 278 comprises an essentially cylindrical valve body 278a which is connected to the end of a driving rod 284 of the electromagnetic actuator 280 and which defines therein an internal space. The cylindrical valve body 278a has an essentially T-shaped fluid passage 278b for selectively communicating the first and second fluid passages 268 and 270 with the outside in accordance with the movement of the valve body 278a.

The electromagnetic actuator 280 is secured to a rocker cover 286, and is controlled on the basis of an ON-OFF signal from a controller (not shown) including a microcomputer. This controller detects the current engine running condition on the basis of output signals from a crank angle sensor, an air flow meter (not shown) and so forth, to output a control signal to the electromagnetic actuator 280.

The operation of this embodiment of the valve timing control system, according to the present invention, is described below.

When, for example, the engine operates in a low load running condition, the controller outputs an OFF signal to the electromagnetic actuator 280, so that the spool valve 278 is held at the left position as shown in FIGS. 9 and 10 by spring force of the coil spring 282. In this position, the valve body 278a opens the second fluid passage 270 to establish the fluid communication between the second fluid passage 270 and the control chamber 266, and closes the first fluid passage 268 to block fluid communication between the first fluid passage 268 and the control chamber 266. Therefore, pressurized fluid, supplied to the control chamber 266 from the oil pump 258, via the main fluid passage 262 and the fluid passage 264, 164, is supplied only to the second hydraulic chamber 236a via the second fluid passage 270 to increase hydraulic pressure within the second hydraulic chamber 236a. As a result, as shown in FIG. 11, the second piston 244 moves toward the lid member 240 against spring force of the compression spring 256 until it bumps against the regulating member 240a. As a result, the second cam member 224 rotates clockwise in FIG. 11 about the supporting shaft 228, so that the outer periphery 224b of the second cam member 224 is separated from the inner periphery 206e of the sprocket body 206. On the other hand, since fluid communication between the first hydraulic chamber 234a and the oil pump 258 is blocked, the first piston 242 moves toward the first hydraulic chamber 234a by the spring force of the compression spring 254, so that the first cam member 222 rotates in the clockwise direction of FIG. 11, so that the outer periphery 222b comes into contact with the inner periphery 206e of the sprocket body 206, which allows positive rotation of the camshaft 200. At this state, if positive rotational torque (clockwise rotation in FIG. 11) is applied to the camshaft 200, further positive rotation of the camshaft 200 is restricted by the stopper pin 214. On the other hand, if negative rotational torque is applied to the camshaft 200, the outer periphery 222b of the first cam member 222 is tightly urged onto the inner periphery 206e of the sprocket body 206 to produce great frictional force so as to restrict negative rotation of the camshaft 200. Therefore, relative rotation of the sprocket 204 to the camshaft 200 is surely regulated in both of positive and negative directions, so that the camshaft 200 is held at a rotational position in which the closing timing of the intake valve is advanced.

Figure 12:
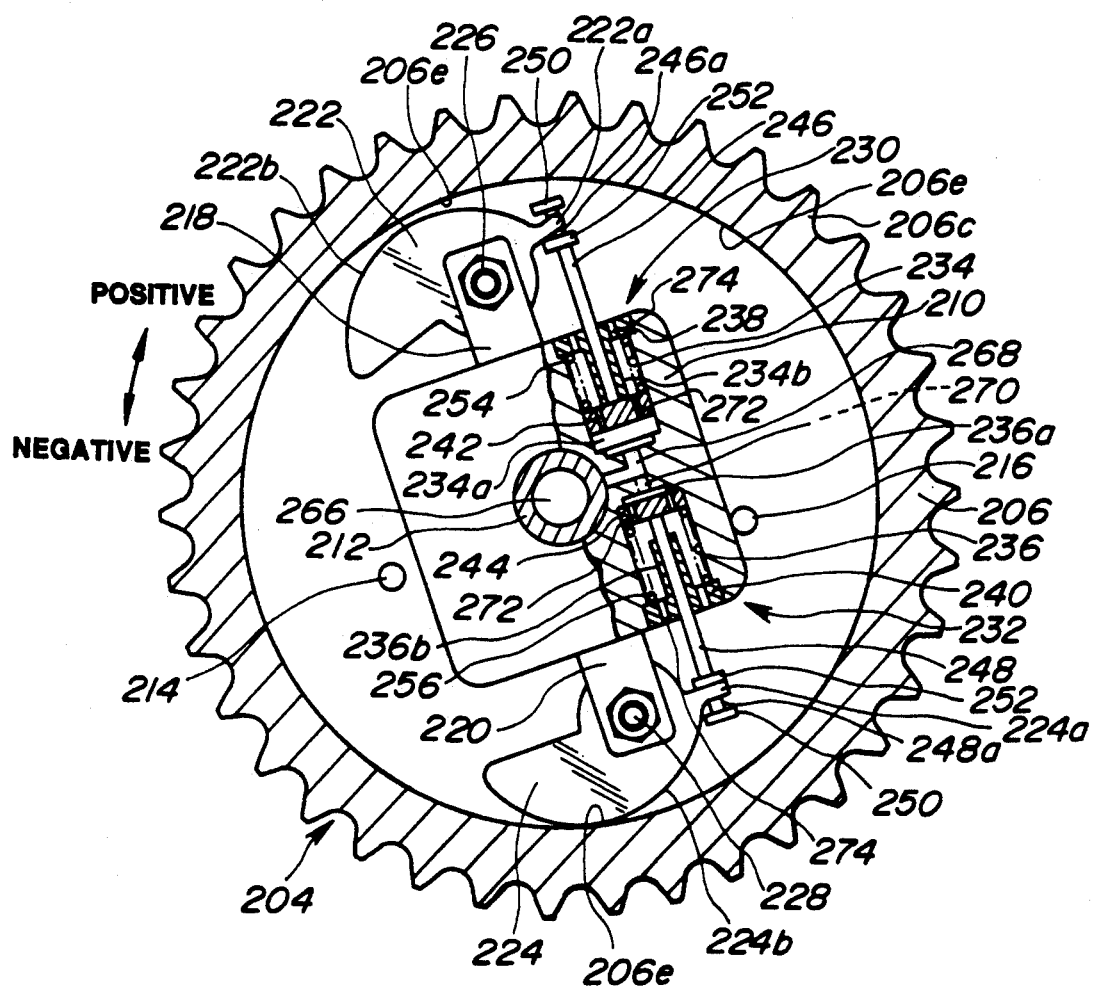

On the other hand, when the engine running condition changes to a high load running condition, the controller outputs an ON signal to electromagnetic actuator 280 for switching the hydraulic circuit 260, so that hydraulic pressure supply to the second hydraulic chamber 236a is blocked, and so that pressurized fluid is supplied to the first hydraulic chamber 234a to increase hydraulic pressure therein. As a result, the first piston 242 moves toward the atmospheric chamber 234b, and the second piston 244 moves toward the hydraulic chamber 236a. Therefore, the outer periphery 222b of the first cam member 222 is separated from the inner periphery 206e of the sprocket body 206, and the outer periphery 224b of the second cam member 224 comes into contact with the inner periphery 206 of the sprocket body 206, which allows only negative rotation of the camshaft 200. After the camshaft 200 rotates to be positioned at a position as shown in FIG. 12, further negative rotation of the camshaft 200 is restricted by the stopper pin 216. In this position, if positive rotational torque is applied to the camshaft 200, the outer periphery 224b of the second cam member 224 is tightly urged onto the inner periphery 206e of the sprocket body 206 to produce great frictional force so as to restrict positive rotation of the camshaft 200. Therefore, relative rotation of the sprocket 204 to the camshaft 200 is surely regulated in both of positive and negative directions, so that the camshaft 200 is held at a rotational position in which the closing timing of the intake valve is delayed.

Furthermore, when pressurized fluid is supplied to the hydraulic chambers 234a and 236a to increase hydraulic pressure therein, fluid existing in the atmospheric chambers 234b and 236b is discharged to the outside via the orifices 274.

In the shown embodiments, although the valve timing control system was applied to an intake valve, it may also be applied to an exhaust valve.

While the present invention has been disclosed in terms of the preferred embodiment in order to facilitate better understanding thereof, it should be appreciated that the invention can be embodied in various ways without departing from the principle of the invention. Therefore, the invention should be understood to include all possible embodiments and modification to the shown embodiments which can be embodied without departing from the principle of the invention as set forth in the appended claims.

What is claimed is:

1. A valve timing control system for an internal combustion engine, comprising:
   a hollow rotary housing driven by an engine output and rotatably supported on a camshaft, said rotary housing having an internal toothed circumference;
   a rotary member housed within said rotary housing and rigidly connected to said camshaft for rotation therewith, said rotary member having a pair of radially extending portions;
   a pair of gears rotatably supported on said radially extending portions, and engaging said internal toothed circumference to be rotatable in accordance with rotation of said rotary housing for causing relative angular displacement of said rotary member to said rotary housing;
   regulating means for regulating relative angular displacement of said rotary member to said rotary housing within a predetermined maximum range;
   clutch means for restricting rotation of said gears so as to be associated with said regulating means for restricting relative angular displacement of said rotary member to said rotary housing; and
   control means for controlling said clutch means in accordance with current engine running condition.

2. A valve timing control system as set forth in claim 1, wherein each of said gears is rotatably supported on said corresponding radially extending portions by means of a supporting shaft.

3. A valve timing control system as set forth in claim 2, wherein each of said gears has a cylindrical projection which extends in a direction of the rotational axis thereof.

4. A valve timing control system as set forth in claim 3, wherein said clutch means has a first coil spring, with which said cylindrical projection and said supporting shaft are tightly bound for restricting rotation of the corresponding gear.

5. A valve timing control system as set forth in claim 4, wherein said clutch means has a sliding member which is slidable within said rotary housing.

6. A valve timing control system as set forth in claim 5, wherein said sliding member causes said first coil spring to become loose in accordance with movement thereof so as to allow rotation of the corresponding gear.

7. A valve timing control system as set forth in claim 6, wherein said clutch means includes a second coil spring for biasing said sliding member in one direction, and a hydraulic circuit controlled by said control means for causing said sliding means to slide in the other direction.

8. A valve timing control system as set forth in claim 5, wherein said clutch means has a cylindrical member arranged around said coil spring, said cylindrical member being rotatable in accordance with movement of said sliding member for causing said first coil spring to become loose to allow rotation of the corresponding gear.

9. A valve timing control system as set forth in claim 1, wherein said regulating means comprises a pair of stopper pins which extend in a direction parallel to the rotational axis of said rotary member.

10. A valve timing control system for an internal combustion engine and a camshaft which is subject to a negative torque in a direction opposite to a direction of rotation thereof and than a positive torque in a direction same as the direction of rotation thereof when the camshaft opens a spring biased valve of the internal combustion engine, the valve timing control system comprises:
   a hollow rotary housing driven by the internal combustion engine;
   a rotary member housed within the hollow rotary housing and secured to the camshaft for rotation therewith;
   a torque transmitting mechanism so constructed and arranged as to transmit a torque from said hollow rotary housing to said rotary member, said torque transmitting mechanism having a first position wherein said rotary member has a first angular position relative to said hollow rotary housing and a second position wherein said rotary member has a second angular position relative to said hollow rotary housing; and
   means for shifting said torque transmitting mechanism between said first and second position thereof, wherein said torque transmitting mechanism includes a brakeable strut radially extending from said rotary member into engagement with said hollow rotary housing in such a manner as to allow one-way angular displacement of said rotary member in response to appropriate one of the positive and negative torque which said rotary member is subject to until said strut or said rotary member comes into abutting engagement with one of stops which are rotatable with said hollow rotary housing.

11. A valve timing control system as claimed in claim 16, wherein after one of said brakeable strut and said rotary member comes into abutting engagement with one of stops, said rotary member follows rotation of said hollow rotary housing owing to abutting engagement with said one of said stops.

12. A valve timing control system as claimed in claim 10, wherein said brakeable strut radially extending from said rotary member includes a gear in mesh with an internal gear of said hollow rotary housing and a releasable one-way clutch.

13. A valve timing control system as claimed in claim 10, wherein said brakeable strut radially extending from said rotary member includes a hydraulic plunger in frictional engagement with a mating inclined surface of a wedge-shaped projection extending inwardly from said hollow rotary housing.

14. A valve timing control system as claimed in claim 10, wherein said brakeable strut radially extending from said rotary member includes a hydraulic cam in frictional engagement with an inner periphery wall of said hollow rotary housing.

* * * * *